Aug. 31, 1943.    W. A. WEIGHTMAN    2,328,040
ASSEMBLY JIG
Filed April 8, 1941    4 Sheets-Sheet 1
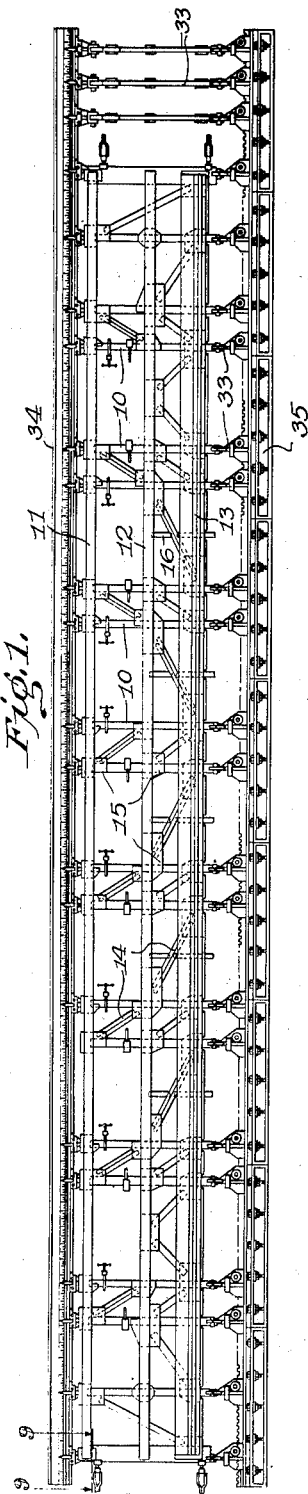
INVENTOR
William A. Weightman
BY John P. Tarbox
ATTORNEY Aug. 31, 1943.  W. A. WEIGHTMAN  2,328,040
ASSEMBLY JIG
Filed April 8, 1941  4 Sheets-Sheet 2
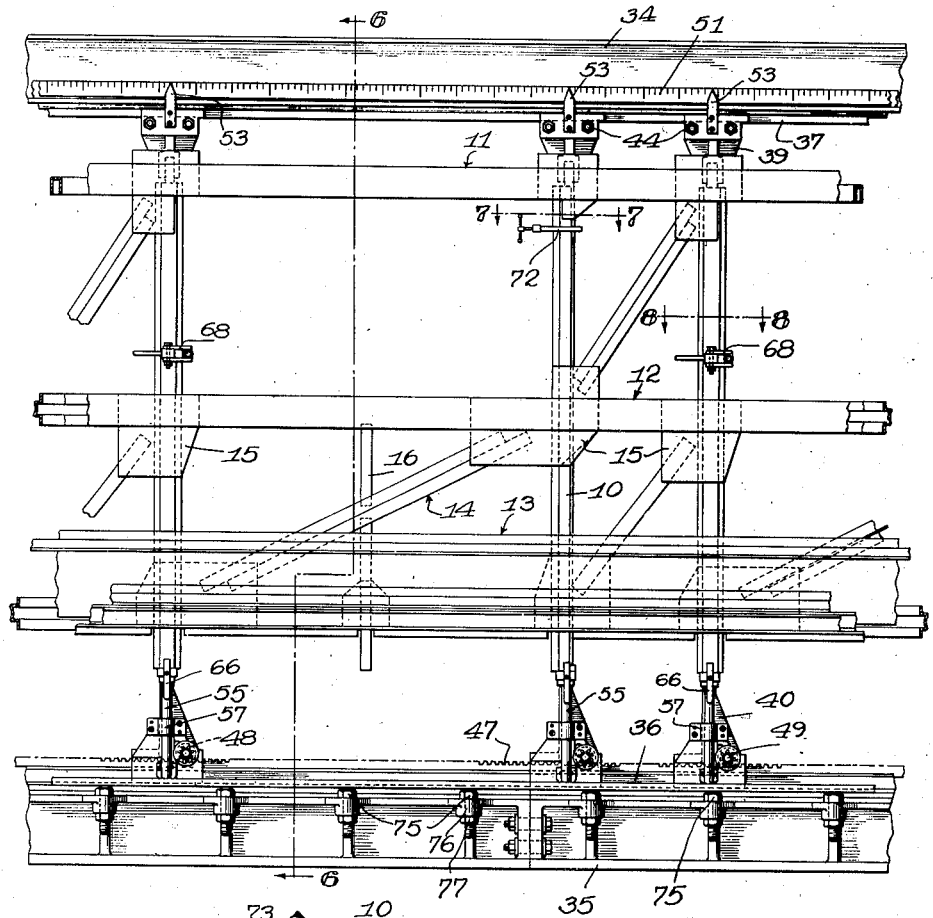
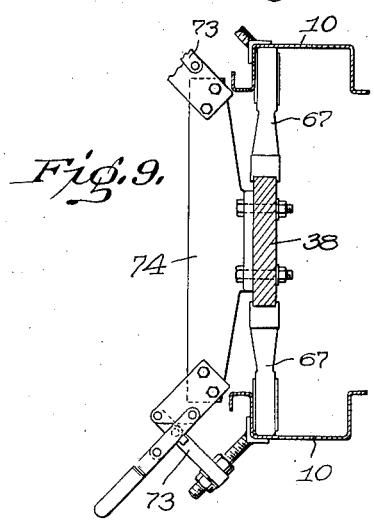
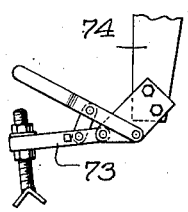
INVENTOR
William A. Weightman
BY John P. Parker
ATTORNEY

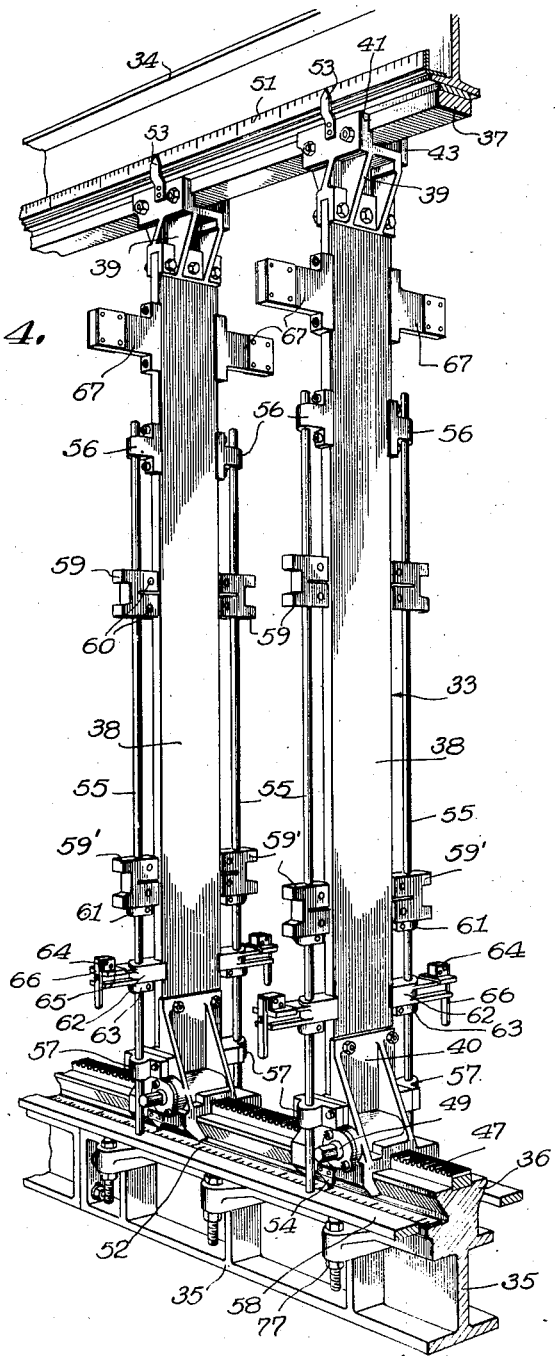

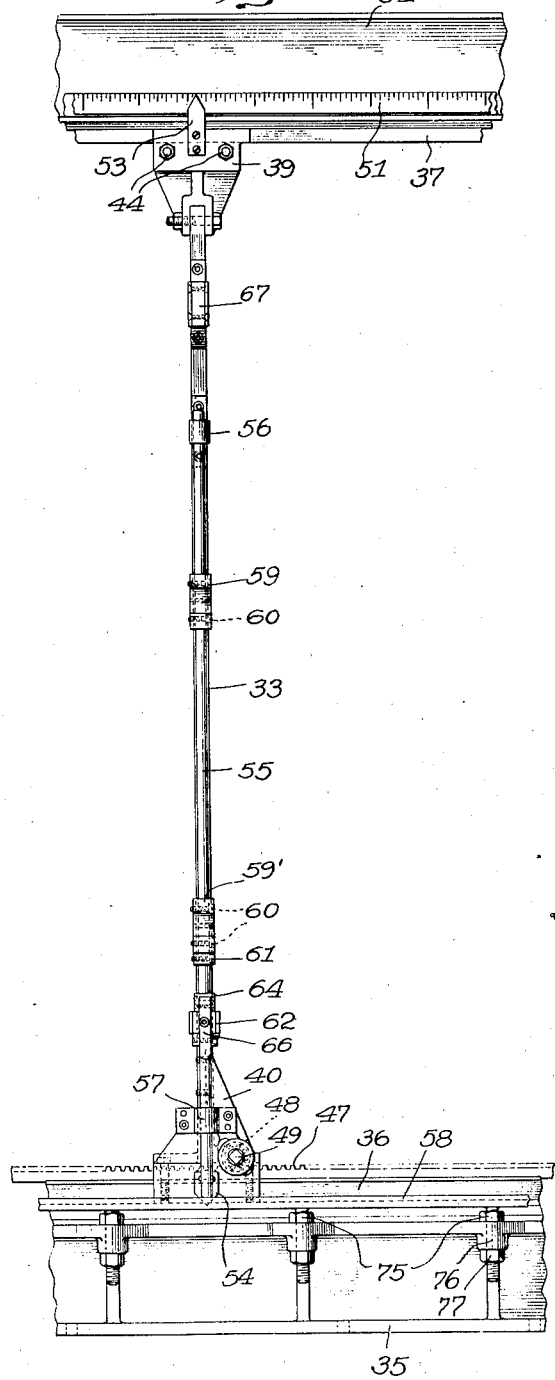
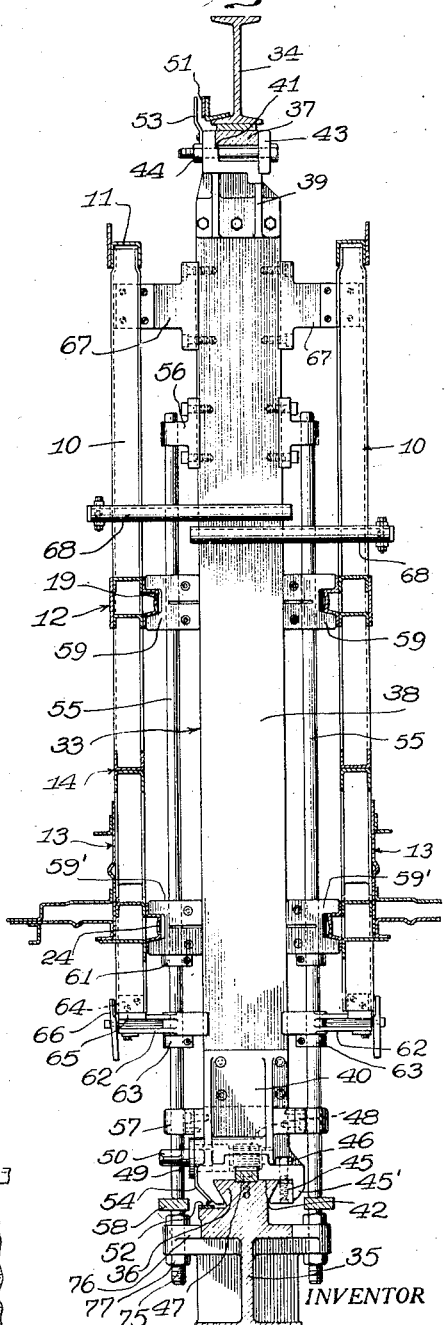

Patented Aug. 31, 1943

2,328,040

UNITED STATES PATENT OFFICE 2,328,040

ASSEMBLY JIG

William A. Weightman, Philadelphia, Pa., assignor to Edward G. Budd Manufacturing Company, Philadelphia, Pa., a corporation of Pennsylvania Application April 8, 1941, Serial No. 387,431

8 Claims. (Cl. 29—89)

The invention relates to an assembly jig, and more particularly to a jig adapted for the assembly of long vertical truss structures, such as the side truss frames of rail car or like vehicle bodies.

It is among the objects of the invention to provide a jig of this class which is of flexible construction so that it can be quickly set up or adjusted to the particular work to be assembled thereon, to provide a jig which is of open construction to make the work mounted thereon readily accessible for spot-welding or other tools used in the assembly of the work, to provide a jig which requires a minimum of change to enable it to be set up for different forms of truss structures, such as truss structures of different lengths, heights, and in which the members forming the truss are differently spaced from each other, and to adapt it to truss structures of different camber. Another object of the invention is the provision of a jig which may be utilized for simultaneously assembling truss structures on opposite sides thereof, so that the number of jigs for a given production may be halved and less floor space occupied for the assembly operations.

These and other objects and advantages are attained by the jig structures described in detail in the following specification and indicated in the drawings forming a part hereof, and in which—

Fig. 1 is a side elevational view of the jig, showing an assembled side frame truss for rail cars in place thereon;

Fig. 2 is a fragmentary perspective view on an enlarged scale, parts being shown in section, of a side frame truss such as is shown in position on the jig in Fig. 1;

Fig. 3 is a fragmentary side elevational view, on an enlarged scale, of a portion of the jig and work as shown in Fig. 1;

Fig. 4 is a fragmentary perspective view of a portion of the jig per se, and on a greatly enlarged scale;

Fig. 5 is a fragmentary side elevational view on approximately the same scale as Fig. 4, showing a single upright column;

Fig. 6 is a transverse sectional view of the jig, showing a side frame truss in position on each side thereof;

Figs. 7 and 8 are detail sectional plan views through an upright column, showing two types of locating and securing means utilized in the jig;

Fig. 9 is a detail sectional plan view through an end column, showing another type of securing and clamping means employed; and Fig. 10 is a fragmentary detail of the clamp shown in Fig. 9, in an inoperative position.

As shown in Figs. 1 and 2, the jig has been set up for the assembly of a rail car side frame truss structure fabricated out of sheet metal, the elements entering into the truss structure being formed out of draw-rolled or die-formed flat strip stock and joined together in the jig by spot-welding or the like.

The main members of the truss may comprise the vertical longitudinally spaced posts 10, a top chord 11, an intermediate chord 12 located below the window openings and a bottom chord 13 forming a strong side sill in the final assembly of the body, and diagonals 14 connected to the chords and posts on both sides of the truss by gussets 15. Intermediate the posts forming the sides of the window openings, may be arranged additional short posts 16 interconnecting the intermediate and bottom chords through the adjacent diagonals.

As shown most clearly in Fig. 2, the top chord may consist of a channel 17 telescoping the tops of the posts and spot-welded thereto through the sides of the channel, and a flat strip 18 welded to the inner side wall of the channel and projecting thereabove.

The intermediate chord 12 may comprise an outer flanged channel molding strip 19 secured to the outer faces of the posts, and an inner flat strip 20 welded to their inner faces, strips 19 and 20 being closed to box-section between the posts by upper and lower channels 21 and 22 bridging the space between the flanges on strip 19 and the strip 20 and spot-welded to each.

The bottom chord 13 may be a composite double-box-section structure comprising a vertically deep flat strip 23 welded to the inner faces of the posts, an outer flanged channel moulding strip 24 corresponding to strip 19, and welded to the outer faces of the posts. These two strips 23 and 24 are joined together between posts by channels as 25 bridging the space between the top flange of channel 24 and strip 23, and by angles, as 26, having their vertical arms secured to the bottom flange of channel 24 and their horizontal arms extended inwardly beyond the bottom margin of strip 23 and secured thereto indirectly, as will now be described. To the inner face of the strip 23 and forming a box-section therewith, are secured a generally Z-section strip 27 and a generally angular section strip 28, these strips being spot-welded to strip 23 through their vertical outer arms and secured together along their inner margins. The strip 28 has the margin of its vertical arm, which is secured to strip 23, extended inwardly by a marginal flange which overlaps the inner margin of the angles 26 and is spot-welded thereto.

A channel 29 may be welded to the under face of the horizontal arm of angle 28 and an angle 30 to the top margin of the inner face of the strip 23. As shown, the posts project below the bottom chord 13.

The diagonals, designated generally by reference character 14, may consist, as shown at 31 in Fig. 2, of two channels secured back to back, or, as shown at 32, of a simple channel. The small vertical posts 16 may also be simple channel sections, turned in opposite directions above and below the diagonals 31.

It will be understood that the side wall truss structure, as described, may be assembled in its entirety on the jig of the invention, or certain elements thereof may be first subassembled on a bench or subassembly jig and brought to the jig in subassembly and joined to the other elements in the jig in final assembly.

The jig according to the invention may comprise a plurality of vertical columns 33 which are slidably mounted at top and bottom for adjustment lengthwise of the jig on top and base rails 34 and 35. The base rail 35 may be built up of a plurality of sections arranged end to end and bolted together (see Fig. 3), each section comprising a casting having a flat base through which it may be secured to the floor of the shop. At the top, the base rail is provided with a dovetail-shaped projection 36 forming a guiding and securing portion of the rail for cooperation with the columns 33.

The top rail may comprise an I-beam suitably supported from the top in a manner not shown, to the bottom of which beam is secured a guiding and securing portion 37 for cooperation with the columns.

Each column may comprise a stiff rectangular metal slab 38 having its greatest cross-sectional dimension arranged transversely of the jig and forming the main body of the column. This slab is widened longitudinally of the jig at top and bottom by brackets 39 and 40 rigidly secured thereto, as by bolts. These brackets have guideways 41 and 42 cooperating, respectively, with the guiding projections 37 and 36 on the top and bottom rails. One side of the guideways is made adjustable, the top one by a clamping block 43 secured by bolts and nuts 44 to the opposite wall of the guideway 41, and the bottom one by a clamping block 45 connected by a bolt 46 to the top wall of the guideway 42 and movable between a vertical shoulder 45' and the inclined opposite face of the dovetailed projection 36. When the bolts 44 and 46 are slackened, the column is loosely guided by the projections 36 and 37 and can then be readily shifted lengthwise of the rails to bring it to the desired location.

The columns may each be readily and accurately moved to the desired location by a rack 47 secured as by screws to the top face of the dovetail projection 36, this rack being slidingly received in a groove formed to receive it in the bottom of the bracket 40. A pinion 48 engages the rack 36, this pinion being fixed to a transverse shaft 49 having its end projecting from the bracket 40 provided with a squared portion 50 adapted to receive a tool for turning the shaft and pinion.

To facilitate the set up, each of the top and bottom rails may be provided with a fixed scale 51 and 52, cooperating with a pointer 53 and 54 secured, respectively, to the top and bottom brackets 39 and 40. When the columns have been moved to the desired location by the rack and pinions, they may be locked fixedly in position by tightening the bolts 44 and 46, which clamps them to the rails.

In the set up shown for assembling the particular form of side frame truss indicated, one of the columns of the jig is associated with each post of the truss, the spacing of the columns corresponding to the spacing of the posts. It will be noted that the top and bottom rails are made longer than the truss shown in Fig. 1, and several of the columns are idle in this set up. The rails are made sufficiently long and provided with an adequate number of vertical columns to make it possible to use the jig for any desired length of side frame truss.

To support the work laterally away from the jig to facilitate access to it with welding tools or the like, suitable supporting and clamping means may be provided. In the form shown, such supporting and clamping means may comprise a vertically slidable rod 55, slidable in bearing brackets 56 and 57 projecting laterally of the jig from each column and rigidly secured thereto as by bolts. The bearings are arranged near the ends of the rod, and the bottom of the rod rests upon a longitudinal bar 58 supported laterally of the base rail 35 and flexible in its vertical plane.

With the set-up for the particular work shown, each rod 55 carries vertically spaced locating brackets 59 and 59', which are split to receive the rod loosely and are clamped to the rod in the desired location by drawing together the split portions by screws 60. If desired, a separate clamping collar 61, as shown in connection with bracket 59', may be employed to assist in supporting the bracket and work.

Each of the brackets 59 and 59' is formed with a central recess to receive and locate, respectively, the molding strip channels 19 and 24 of the work. To locate and support the posts 10 of the work, each rod 55 is provided with a lower bracket 62, slidably guided by the rod 55 and the lateral margin of the column slab 38 and supported in place on the rod by a clamping collar 63 similar to collar 61. This bracket has an upward projection 64 at its outer end which fits with the post section, the bottom of the post resting on the shoulder 65 at the base of projection 64. Any suitable clamp may be employed to clamp the bottom of the post to the bracket. A simple rotary wedge clamp 66 has been shown.

At the top, each post is located and supported by a bracket 67 of T-shape having the arms of the T secured to the lateral face of the column as by bolts, the free end of the stem of the T projecting into the post and conforming to its section. Any suitable clamping means may be employed to secure this upper end of the post in place. In Figs. 6 and 8 is shown a form of clamp 68 which may be employed. This clamp is of generally C-form, engaging through one arm the face of the column opposite the side to which the work is secured, its opposite arm carrying an eccentric 69 rotatable by a handle 70 to clamp the post 10 in place. To avoid marring or scratching the face of the post through engagement with the eccentric, a flexible strip 71, secured to the clamp and extending between the eccentric and post, may be employed.

As shown in Fig. 7, an ordinary C-clamp 72 may be employed to secure the post in place, particularly where the post is of the Z-section shown in that figure.

As shown in Fig. 9, a different form of clamp may be employed to clamp the end posts in place. The clamp there shown is a usual form of toggle clamp 73, which can be swung away from the work into inoperative position, as shown in Fig. 10. This clamp may be supported by a bracket 74 bolted to the adjacent column body 38.

Truss structures of the class for which the jig is designed are preferably originally assembled with a certain camber which varies with the length of the structure and the manner in which it carries the load. To enable the jig to be readily adjusted to the particular camber suited to the work under assembly, the bar 58 supporting the rods 55 and the work is flexible and supported at intervals only by adjustable screws 75 passing through lugs 76, see Fig. 4, extending laterally from the bottom rail 35. By adjusting these screws individually, the flexible bar, and consequently the work, may be given any desired camber during assembly. The screws 75 may be provided with lock nuts, as 77, to secure them in adjusted position.

An important feature of the jig is the provision of work-supporting means on both sides of the jig, so that two truss structures may be simultaneously assembled on the same jig. To this end, the work-supporting means hereinbefore described in connection with one lateral face of the columns, may be duplicated in symmetrical arrangement on the opposite face of the jig, as clearly shown in Figs. 4 and 6 of the drawings. Thus the jig can be simultaneously used by two sets of workmen on opposite sides thereof, working on separate workpieces. This is particularly true where the work is symmetrical about a central vertical transverse plane.

While the jig has been herein described as set up for a particular class of work, it will be understood that many features thereof are applicable to work of different classes, its flexibility enabling it to be quickly set up to accommodate the work at hand, without departing from the main features thereof. In the claims following, such modifications as would still maintain its main features are intended to be protected.

What is claimed is:

1. A jig of the class described, comprising longitudinally spaced vertical columns arranged in a common plane, each column having secured to at least one side thereof vertically spaced bearing brackets, a rod guided for vertical movement in said brackets, said rod carrying positioning and supporting means for the work, said last-named means being longitudinally adjustable on the rod.

2. A jig of the class described, comprising longitudinally spaced vertical columns arranged in a common plane, each column having secured to at least one side thereof vertically spaced brackets, a rod carrying positioning and supporting means for the work and guided for vertical movement in said brackets, and means for adjusting the vertical position of said rod.

3. A jig of the class described, comprising longitudinally spaced vertical columns arranged in a common plane, each column having secured to at least one side thereof vertically spaced brackets, a rod supported in said brackets, said rod carrying positioning and supporting means for the work, and additional positioning and supporting means for the work directly secured to said column.

4. A jig of the class described, comprising base and top rails and spaced upright columns secured to said rails, each of said columns having associated therewith a vertically slidable rod carrying locating and securing means for the work, a longitudinally extending flexible member commonly engaging the lower ends of all of said rods, and means supporting said member from the base rail at longitudinally spaced points, said means being individually adjustable at said points to raise or lower the portion of the member supported thereby whereby to vary the contour of the member lengthwise of the jig.

5. A jig of the class described, having spaced aligned vertically arranged work-supporting members, each mounted to slide vertically in a support, a flexible bar underlying and supporting each of said members, and longitudinally spaced independently adjustable means for locally raising or lowering the bar whereby to vary its contour and the vertical position of said members.

6. In an assembly jig, a rail and a plurality of columns, cooperating means on said rail and said columns for supporting and guiding said columns on and along said rail, means on said columns for supporting the members of a structure to be assembled, elongated means substantially coextensive with and arranged along said rail, and individual driving means mounted on said columns and each adapted to operatively engage said elongated means for moving said columns individually to any desired position along said rail.

7. A jig of the class described, comprising longitudinally spaced vertical columns arranged in alignment and each having one side substantially in a common plane so as to outline a jig surface, each column carrying on said side a rod, means guiding each rod on its column for vertical movement, work supporting and securing means on each rod, a longitudinally extending flexible bar extending across all of the rods, each rod being associated with said bar for partaking in the movement thereof, adjusting means spaced along the length of the bar for varying the height of the bar at the desired locations so as to vary the vertical relative position of said rods at different points in the length of the bar and thereby to derive the desired camber of the work engaging means.

8. In an assembly jig according to claim 6 in which said elongated means comprises a rack and said individual driving means comprises a pinion meshing with said rack, and having means for rotating it.

WILLIAM A. WEIGHTMAN.